US011561182B2

United States Patent
Zhao et al.

(10) Patent No.: US 11,561,182 B2
(45) Date of Patent: Jan. 24, 2023

(54) METHOD FOR DETECTING QUALITY OF CELL CULTURE FLUID BASED ON RAMAN SPECTRAL MEASUREMENT

(71) Applicant: SUZHOU BASECARE MEDICAL DEVICE CO., LTD., Suzhou (CN)

(72) Inventors: Yilei Zhao, Suzhou (CN); Bo Liang, Suzhou (CN); Liming Xuan, Suzhou (CN); Lingyin Kong, Suzhou (CN); Guoning Liu, Suzhou (CN)

(73) Assignee: SUZHOU BASECARE MEDICAL DEVICE CO., LTD., Suzhou (CN)

( * ) Notice: Subject to any disclaimer, the term of this patent is extended or adjusted under 35 U.S.C. 154(b) by 632 days.

(21) Appl. No.: 16/499,941

(22) PCT Filed: Jan. 12, 2018

(86) PCT No.: PCT/CN2018/072393
§ 371 (c)(1),
(2) Date: Oct. 1, 2019

(87) PCT Pub. No.: WO2018/188395
PCT Pub. Date: Oct. 18, 2018

(65) Prior Publication Data
US 2021/0116382 A1 Apr. 22, 2021

(30) Foreign Application Priority Data
Apr. 10, 2017 (CN) .......................... 201710227963.9

(51) Int. Cl.
*G01N 21/65* (2006.01)
*G01N 21/03* (2006.01)

(52) U.S. Cl.
CPC ......... *G01N 21/65* (2013.01); *G01N 21/0303* (2013.01); *G01N 2021/651* (2013.01);
(Continued)

(58) Field of Classification Search
CPC ......... G01N 2021/651; G01N 21/0303; G01N 21/65; G01N 2201/06113; G01N 2201/0636
(Continued)

(56) References Cited

U.S. PATENT DOCUMENTS

| | | | |
|---|---|---|---|
| 2008/0033658 A1* | 2/2008 | Dalton ................... | G16H 10/20 702/19 |
| 2012/0035442 A1 | 2/2012 | Barman et al. | |

(Continued)

FOREIGN PATENT DOCUMENTS

| | | |
|---|---|---|
| CN | 101082585 A | 12/2007 |
| CN | 103901014 A | 7/2014 |

(Continued)

OTHER PUBLICATIONS

International Search Report from International Application No. PCT/CN2018/072393 dated Mar. 27, 2018.
(Continued)

*Primary Examiner* — Sunghee Y Gray
(74) *Attorney, Agent, or Firm* — Dorsey & Whitney LLP

(57) ABSTRACT

A method for detecting the quality of cell culture fluid based on Raman spectral measurement. The method comprises the following steps: collecting cell culture fluid; collecting, processing and analyzing a Raman spectral signal; measuring an original Raman spectral signal of a metabolite in the cell culture fluid using a Raman spectra technique; determining whether the original Raman spectral signal is qualified, and carrying out data signal processing on the qualified original Raman spectral signal to obtain analyzable signals; and then carrying out difference statistical analysis on the analyzable signals to obtain difference signals; carrying out modeling using the difference signals; classifying the difference signals using a support vector machine; and distin-
(Continued)

guishing the spectral signals of normal and abnormal cell culture fluid to obtain a quality result of the cell culture fluid. Difference signals in cell culture fluid are detected by means of Raman spectra to detect the quality of the cell culture fluid, thereby achieving the purpose of non-invasive evaluation of a cell growth state; and the method is convenient, effective and low-cost, and can achieve large-scale industrialization and streamlining.

7 Claims, 4 Drawing Sheets

(52) U.S. Cl.
CPC ............. *G01N 2201/0636* (2013.01); *G01N 2201/06113* (2013.01)

(58) Field of Classification Search
USPC .......................................................... 702/19
See application file for complete search history.

(56) References Cited

U.S. PATENT DOCUMENTS

| | | | | |
|---|---|---|---|---|
| 2014/0106469 | A1* | 4/2014 | Wu | G01N 33/54373 436/501 |
| 2016/0376627 | A1* | 12/2016 | Zengler | A61K 35/74 424/93.3 |

FOREIGN PATENT DOCUMENTS

| | | |
|---|---|---|
| CN | 103940801 A | 7/2014 |
| CN | 104634771 A | 5/2015 |
| CN | 107132208 A | 9/2017 |
| DE | 29824644.9 U1 | 12/2001 |
| WO | 2016003371 A1 | 1/2016 |

OTHER PUBLICATIONS

Fenn, Michael B. et al., "Raman Spectroscopy Utilizing Fisher-Based Feature Selection Combined With Support Vector Machines for the Characterization of Breast Cell Lines", Journal of Raman Spectroscopy, vol. 44, No. 7, Jul. 2013, pp. 939-948.

Li, Boyan et al., "Rapid Characterisation and Quality Control of Complex Cell Culture Media Solutions Using Raman Spectroscopy and Chemometrics", Biotechnology and Bioengineering, vol. 107, No. 2, Oct. 1, 2010, pp. 290-301.

Milewski, Robert J. et al., "Automated Processing of Label-Free Raman Microscope Images of Macrophage Cells With Standardized Regression for High-Throughput Analysis", Immunome research, vol. 6, No. 11, Nov. 19, 2019.

Villa-Manriquez, José F. et al., "Raman Spectroscopy and PCA-SVM as a Non-Invasive Diagnostic Tool to Identify and Classify Qualitatively Glycated Hemoglobin Levels In Vivo", Journal of Biophotonics, vol. 10, No. 8, Dec. 23, 2016, pp. 1074-1079.

Zhang, Zhi-Min et al., "An Intelligent Background-Correction Algorithm for Highly Fluorescent Samples in Raman Spectroscopy", Journal of Raman Spectroscopy, vol. 41, No. 6, Oct. 9, 2009, pp. 659-669.

\* cited by examiner

METHOD FOR DETECTING QUALITY OF CELL CULTURE FLUID BASED ON RAMAN SPECTRAL MEASUREMENT

TECHNICAL FIELD

The present disclosure relates to the field of cell culture medium assessment, and in particular, to a method of assessing quality of a cell culture medium based on Raman spectroscopic measurement.

BACKGROUND

A rapid, efficient, and noninvasive assessment method can be developed by using Raman spectroscopy combined with chemometrics methods to evaluate cell culture medium with complex components, thereby determining the cell growth status. Since complex sample preparation is not required and water has no signal interference, Raman spectroscopy has significant advantages in detection of multi-component aqueous solutions. Spectral technology is convenient to operate, low in cost and widely applied to the medical field, and has breakthroughs in application concepts and technical innovation.

In practical applications, cell activity identification technology which is rapid, accurate, and low in cost is urgently needed. Low molecular weight metabolites, as final products in cellular regulation process, can reveal the response of biological system to changes in nutrients and environmental factors, reflecting cell viability more quickly. Therefore, cell growth quality can be assessed by measuring changes in metabolite and medium consumption preferences in the cell culture medium.

In terms of the mechanism of cell culture medium affecting cell development, more studies in the early stage focuses on the analysis of certain specific metabolites to be used as a biomarker for characterizing the cell development potential. However, due to the sequence and diversity of metabolite levels, there is currently no clear biomarker which can be applied in all culture conditions and culture processes, and it is inconclusive as to which components play a central role in cell growth activity. Recent studies have focused on the analysis of the whole metabolic fingerprint, i.e., a dynamic quantitative analysis of all low molecular weight compounds (relative molecular weight <1000) in specific physiological or developmental cells.

The current research on assessment of cell culture medium by Raman spectroscopy is still in development. In the prior art, five kinds of mixture solutions with clear chemical components, such as various amino acids, various organic acids or inorganic acids, were detected by AVALON Raman spectrometer. Principal component analysis and independent soft mode cluster analysis were used for data analysis and comparison, and the established analysis model can accurately identify the culture medium quality. In addition, Raman spectroscopy was used to detect various CHO (Chinese hamsters Ovary) cell culture mediums, and the least squares method was used for data analysis. A method of noninvasive real-time determination of glucose and lactic acid in culture medium by Raman spectroscopy was established. Based on the current research, by detecting the Raman spectrum of the culture medium of the same type of cells under the same culture condition, and using a support vector machine method to classify and model the data, the present disclosure establishes a perfect data acquisition, preprocessing, and data modeling process, and achieves efficient and non-invasive cell growth activity identification, which can be further popularized for clinical application.

SUMMARY

Object of the disclosure: the present disclosure aims to provide a method of assessing quality of a cell culture medium based on Raman spectroscopic measurement, which has a high accuracy, simple detection process, and low cost.

Technical solution: a method of assessing quality of a cell culture medium based on Raman spectroscopic measurement, including the following steps of:

(1) collection of cell culture medium: obtaining cell culture medium after cell cultured for a period of time;

(2) collection of Raman spectral signal: measuring an original Raman spectral signal of metabolites in the cell culture medium obtained in step (1) using Raman spectrometer, determining whether the original Raman spectral signal is qualified, proceeding to step (3) if yes; otherwise, repeatedly performing the Raman spectroscopic measurement on the cell culture medium;

(3) processing of Raman spectral signal: performing data signal processing on the qualified original Raman spectral signal obtained in step (2) to obtain an analyzable signal; and (4) analysis of Raman spectral signal: performing differential statistical analysis on the analyzable signal obtained in step (3) to obtain a differential signal, modeling the differential signal, classifying the differential signal by a support vector machine, and distinguishing normal and abnormal cell culture medium spectral signals to obtain a quality result of the cell culture medium.

In addition, the cell culture medium obtained in step (1) is 7 μl.

In addition, the 7 μl of the cell culture medium is placed in a micro-volume cuvette.

In addition, the micro-volume cuvette includes a hemispherical reflector or a reflector group consisting of a hemispherical reflector and a cylindrical reflector, and the hemispherical reflector and the reflector group all have highly reflective mirror surfaces.

In addition, the mirror surface is coated with a dielectric film or an inert metal film.

In addition, the period of time in step (1) ranges from 3 days to 4 days.

In addition, a process of determining whether the original Raman spectral signal is qualified in step (2) is: an absolute peak intensity CV of a scattering peak of 0.5% ethanol solution at 880 $cm^{-1}$ is less than or equal to 5%, and a Raman shift fluctuation range is less than or equal to 2 $cm^{-1}$.

In addition, the performing data signal processing on the obtained original Raman spectral signal in step (3) includes:

1) performing data correction on the obtained original Raman spectral signal;

using the least squares algorithm to find a best function match of a data by minimizing a sum of squares of errors, and the best function match achieves the data correction by minimizing a sum of squares of a distance between a sampling point and a fitting curve;

2) removing a fluorescence signal background from the signal after the data correction;

a. accurately determining a peak position by using a continuous wavelet mode matching method taking Mexican hat wavelet as a generating function;

b. determining an initial position of the peak by continuing to use a continuous wavelet derivation method taking Haar wavelet as a generating function; and c. fitting a smooth adjustable background by using a penalty least square method; and 3) performing homogenization treatment on the signal after removing the fluorescence signal background;

performing the homogenization treatment on the signal after removing the fluorescence signal background based on Stouffer's Z-score algorithm to obtain the analyzable signal.

Beneficial effects: compared with the prior art, the present disclosure assesses the quality of the cell culture medium by detecting the differential signal in the cell culture medium by Raman spectroscopy, thus achieving the purpose of non-invasive evaluation of the cell growth state, and being of great value in various fields. For example, in clinical applications, the method can be popularized to non-invasive detection of embryo quality, and real-time on-line detection of cell growth and protein expression status can be performed during pharmaceutical recombinant protein production. The present disclosure is convenient, effective, low-cost, suitable for large-scale popularization, and can be industrialized and streamlined on a large scale without being limited by geographical restrictions and lack of professional personnel.

DETAILED DESCRIPTION OF THE EMBODIMENTS

Figure 1:
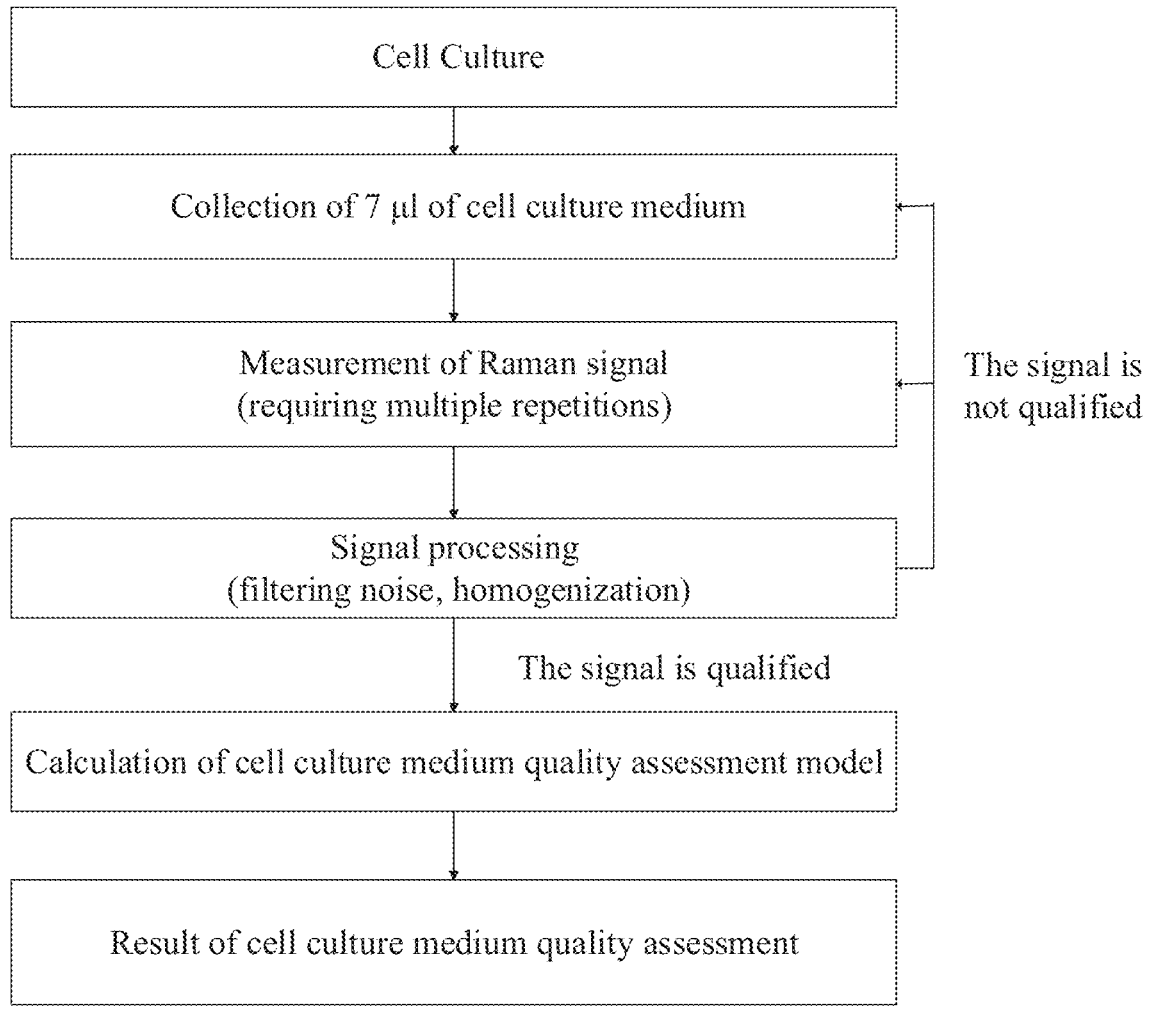
FIG. 1 is a flowchart of a method according to the present disclosure.

The present disclosure will be described in detail below with reference to the accompanying drawings:

Referring to FIG. 1, a method of assessing quality of cell culture medium based on Raman spectroscopic measurement according to the present disclosure includes the following steps of:

(1) Collection of cell culture medium: a cell culture medium that is cell cultured for a period of time is obtained.

(2) Collection of Raman spectral signal: an original Raman spectral signal of metabolites in the cell culture medium obtained in step (1) is measured by using Raman spectroscopy. It is determined whether the original Raman spectral signal is qualified, it is proceeded to step (3) if yes, and otherwise, the Raman spectroscopic measurement is repeatedly performed on the cell culture medium.

A process of determining whether the original Raman spectral signal is qualified is: an absolute peak intensity CV of a scattering peak of 0.5% ethanol solution at 880 $cm^{-1}$ is less than or equal to 5%, and a Raman shift fluctuation range is less than or equal to 2 $cm^{-1}$.

(3) Processing of Raman spectral signal: signal data processing is performed on the qualified original Raman spectral signal obtained in step (2) to obtain an analyzable signal. The step of performing data signal processing on the obtained original Raman spectral signal are specifically as follows:

1) Data correction is performed on the obtained original Raman spectral signal.

The least squares algorithm is used to find a best function match of a data by minimizing a sum of squares of errors, and the best function match achieves the data correction by minimizing a sum of squares of a distance between a sampling point and a fitting curve.

2) A fluorescence signal background is removed from the signal after the data correction.

a. A peak position is accurately determined by using a continuous wavelet mode matching method taking Mexican hat wavelet as a generating function.

b. An initial position of the peak is determined by continuing to use a continuous wavelet derivation method taking Haar wavelet as a generating function.

c. A smooth adjustable background is fitted by using a penalty least square method.

3) Homogenization treatment is performed on the signal after removing the fluorescence signal background.

The homogenization treatment is performed on the signal after removing the fluorescence signal background based on Stouffer's Z-score algorithm to obtain the analyzable signal.

(4) Analysis of Raman spectral signal: differential statistical analysis is performed on the analyzable signal obtained in step (3) to obtain a differential signal. The differential signal is modeled and classified by a support vector machine. The normal and abnormal cell culture medium spectral signals are distinguished to obtain a quality result of the cell culture medium.

The method of assessing the quality of the cell culture medium based on Raman spectroscopic measurement according to the present disclosure is described in detail below with reference to specific embodiments, which includes the following steps of:

(1) Collection of cell culture medium: a cell culture medium that is cell cultured with standard method for a period of time is obtained.

The spectral signals of the metabolites in the cell culture medium are determined by Raman spectroscopy using 7 of the cell culture medium on day 3 to day 4 after inoculation. Since the medium is in a trace amount, the process must be performed in a micro-volume cuvette designed for this technology to perform the signal detection.

Figure 2:
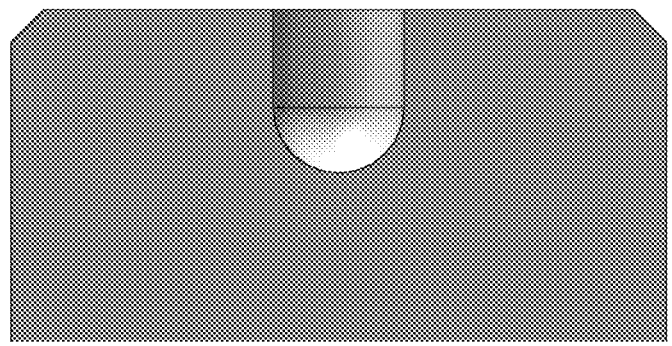
FIG. 2 is a schematic diagram of a micro-volume cuvette according to the present disclosure.
Figure 3:
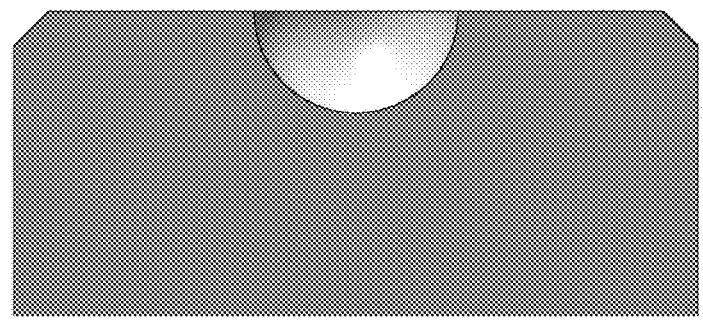
FIG. 3 is a schematic diagram of another micro-volume cuvette according to the present disclosure.

Referring to FIGS. 2 and 3, the micro-volume cuvette consists of a hemispherical reflector and a cylindrical reflector, or is composed of a hemispherical reflector. By processing metal aluminum or copper with a diamond lathe, a highly reflective mirror surface is obtained, which has a high reflection on both the probe light and Raman scattered light. In order to prevent oxidation or corrosion, the mirror surface can be coated with a dielectric film or an inert metal film. A 785 nm laser and a micro-volume cuvette consisting of a hemispherical reflector and a cylindrical reflector are used for Raman detection. The micro-volume cuvette is placed in a predetermined fixing device, such that a center of the cylindrical reflector is concentric with the laser beam and the focus of the laser beam coincides with the center of the hemispherical reflector.

(2) Collection of Raman spectral signal: an original Raman spectral signal of metabolites in the cell culture medium obtained in step (1) is measured by using Raman spectroscopy. It is determined whether the original Raman spectral signal is qualified, it is proceeded to step (3) if yes, and otherwise, the Raman spectroscopic measurement is repeatedly performed on the cell culture medium. Due to the fluctuation characteristic of the spectral signal, repeated measurements are required to be performed on the same sample for multiple times, so that the detection accuracy of the spectral signal is improved. In the present embodiment, the number of samples for data modeling and testing is shown in Table 1.

TABLE 1

Number of samples for data modeling and testing

| Group | Sample quantity |
| --- | --- |
| Abnormal cell culture medium List1 | 181 samples |
| Normal cell culture medium List2 | 428 samples |

According to Bessel formula, the standard deviation is theoretically a constant δ, and as the number of measurements increases, the S value approaches δ instead of approaching zero. By properly increasing the number of measurements, the precision of the arithmetic mean can be improved, and large errors can be conveniently shown. However, after the number of measurements reaches a certain value, for example, after 10 times, the standard deviation of the average value decreases slowly with the increase of the number of measurements.

$$\text{Bessel formula } S(V_i) = \sqrt{\frac{\sum_{i=1}^{n}(V_i - V)^2}{n-1}}$$

S(Vi) is the standard deviation of the experiment, n is the number of repeated measurements, and V is the arithmetic mean of n measurements.

Figure 4:
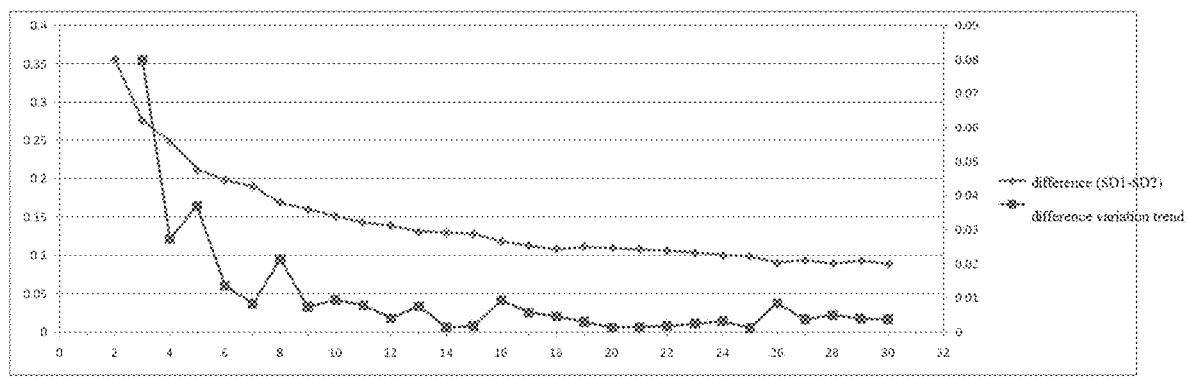
FIG. 4 is a comparison diagram of the optimal number of repeated measurements according to an embodiment of the present disclosure.
Figure 5:
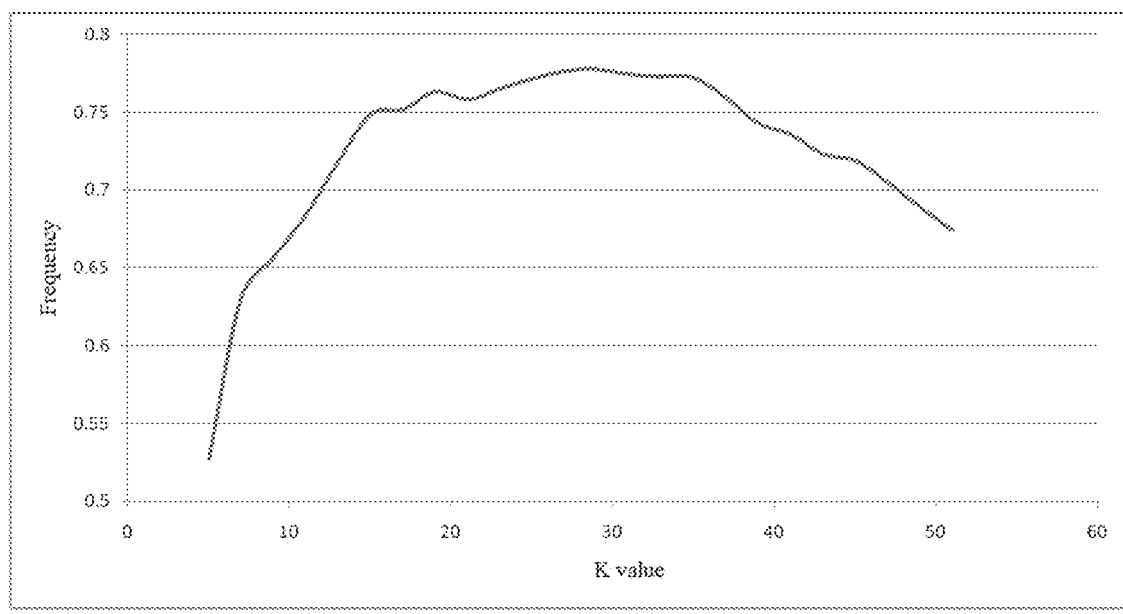
FIG. 5 is a diagram showing a relationship between K value and frequency according to an embodiment of the present disclosure.

According to this conclusion, 2 to 30 samples are randomly selected from the file list of LIST2 to calculate their SD values, and the difference between their SD1 values and the SD2 values calculated by all the LIST2 is compared. Specifically, referring to FIG. 4, the difference curve in FIG. 4 represents the SD value obtained by random sampling minus the SD value of all samples of LIST2. The difference variation trend curve represents the difference between two adjacent sampling points after the sample quantity is increased, which can reflect that the SD value obtained by sampling becomes closer to the SD value of a real sample along with the increase of the sample quantity. It can be seen from FIG. 4 that after the ninth sampling, the variation range of the difference variation trend curve is more and more stable, and the SD value thereof is more and more close to the true value, so that 9 can be selected as the minimum number of measurements.

(3) Processing of Raman spectral signal: data signal processing is performed on the qualified original Raman spectral signal obtained in step (2) to obtain an analyzable signal. Since the cell culture medium has a volume of only 7 μl and there is strong background interference in the signal (about 99.9% of the signal comes from the background of the culture medium), it can be expected that the fluctuation signal caused by the cell metabolism to the culture medium is less than 0.1%. The background signal cancellation algorithm is used to achieve the purpose of reducing the noise signal and enhancing the target signal. Data signal processing is required to be performed on the obtained original Raman signal, and the steps include: 1) data correction; 2) removal of the fluorescence signal background; and 3) homogenization.

1) Data correction is performed on the obtained original Raman spectral signal.

The least squares algorithm is used to find a best function match of a data by minimizing a sum of squares of errors, and the best function match achieves the data correction by minimizing a sum of squares of a distance between a sampling point and a fitting curve.

2) A fluorescence signal background is removed from the signal after the data correction.

Firstly, a peak position is accurately determined by using a continuous wavelet mode matching method taking Mexican hat wavelet as a generating function. Then, an initial position of the peak is determined by continuing to use a continuous wavelet derivation method taking Haar wavelet as a generating function. Finally, a smooth adjustable background is fitted by using a penalty least square method.

3) Homogenization treatment is performed on the signal after removing the fluorescence signal background.

In order to enable the comparison of multiple groups of data, the data is required to be homogenized, and the homogenization treatment is performed on the signal after removing the fluorescence signal background based on Stouffer's Z-score algorithm to obtain the analyzable signal.

In order to enhance the target signal, the Stouffer's Z-score algorithm is used, which requires the determination of the optimal solution for the K value.

The difference between the data in List1 and the data in List2 (P<0.05) is counted according to different parameters K. In order to select the optimal parameter K, the frequency of all abnormal points under each parameter K (formula 1) is required to be calculated, so that the frequency of each parameter K under LIST1 can be obtained, as shown in Table 2.

Formula 1

$$Freq\ 1 = \frac{\sum \frac{\text{the number of abnormalities of this point under different parameters } K}{24}}{\text{the number of abnormal points under current } K \text{ value}}$$

Description of Formula 1:

A. constant 24:

Values of K was taken by 5 to 51 and step=2, and totally 24 groups of abnormal point data were performed.

B. the number of abnormalities of this point under different parameters K:

The number of occurrences of an abnormal point under the current K value in all 24 analyses.

C. the number of abnormal points under current K value:

The number of all points with P<0.05 under the current K value.

The Freq1 frequency distribution under the current K value calculated by formula 1 is shown in FIG. 3, and the K value with the maximum frequency is selected as the optimal K. It can be found that the frequency reaches the highest when K=29.

TABLE 2

Table of frequency of each parameter K in LIST1

| | K value | | | | | |
|---|---|---|---|---|---|---|
| | 5 | 7 | 9 | 11 | 13 | 15 |
| Frequency | 0.527 | 0.630 | 0.656 | 0.684 | 0.717 | 0.749 |

| | K value | | | | | |
|---|---|---|---|---|---|---|
| | 17 | 19 | 21 | 23 | 25 | 27 |
| Frequency | 0.752 | 0.763 | 0.758 | 0.765 | 0.772 | 0.776 |

| | K value | | | | | |
|---|---|---|---|---|---|---|
| | 29 | 31 | 33 | 35 | 37 | 39 |
| Frequency | 0.778 | 0.774 | 0.773 | 0.772 | 0.759 | 0.743 |

| | K value | | | | | |
|---|---|---|---|---|---|---|
| | 41 | 43 | 45 | 47 | 49 | 51 |
| Frequency | 0.736 | 0.723 | 0.719 | 0.705 | 0.689 | 0.674 |

Figure 6:
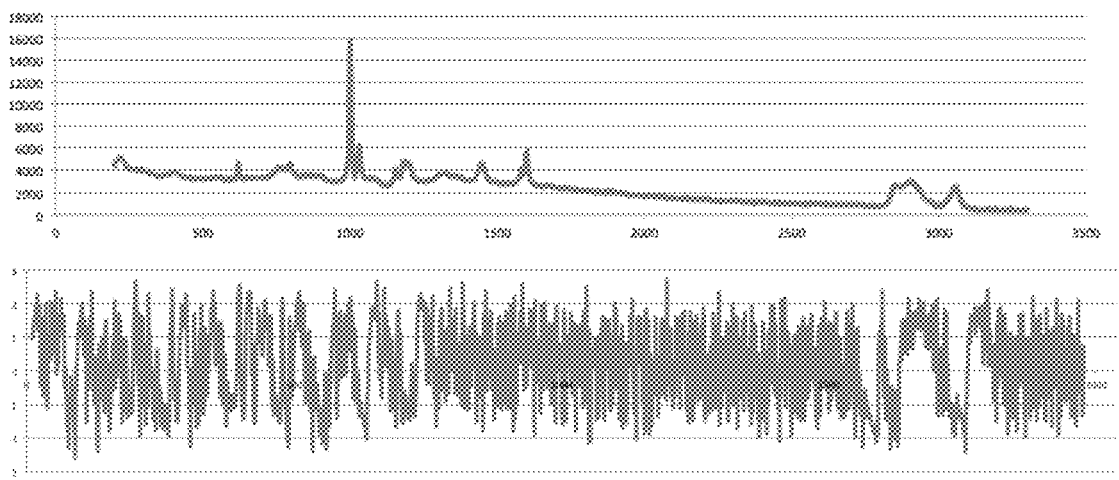
FIG. 6 is a comparison diagram before and after signal processing according to an embodiment of the present disclosure.

After determining the optimal K value, the processed signal can be obtained by using the background signal cancellation algorithm. The signal comparison before and after processing is as shown in FIG. 6.

Figure 7:
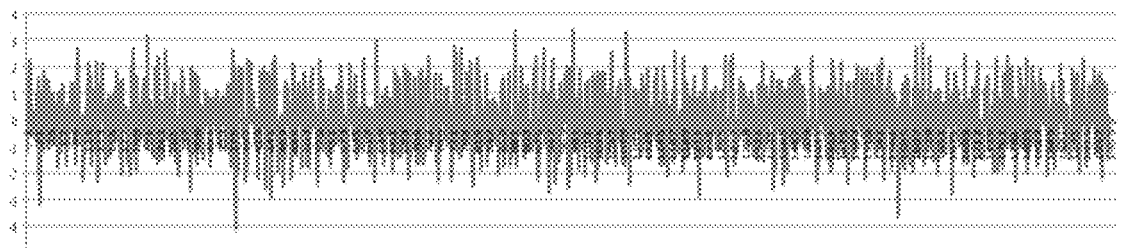
FIG. 7 is a T-value distribution diagram of U-tests of LIST1 and LIST2 according to an embodiment of the present disclosure.
Figure 8:
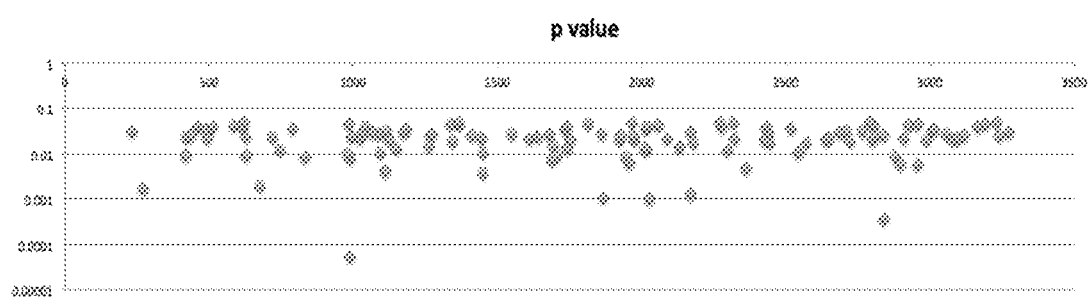
FIG. 8 is a schematic diagram showing 100 points with the largest difference between P-values of LIST1 and LIST2 according to an embodiment of the present disclosure.

Referring to FIG. 7 and FIG. 8, a two-sample U-test comparison is performed on the processed LIST1 and LIST2 signals to find the 100 data points with the greatest difference (or data points with p values <0.05) as obvious differential points required by subsequent SVM classification.

(4) Analysis of Raman spectral signal: differential statistical analysis is performed on the analyzable signal obtained in step (3) to obtain a differential signal. The differential signal is modeled and classified by a support vector machine. The normal and abnormal cell culture medium spectral signals are distinguished to obtain a quality result of the cell culture medium.

(5) Classification of the cell culture medium using support vector machine (SVM) algorithm: since the SVM algorithm is used for the normal/abnormal classification of the cell culture medium, the normal cell culture medium signal and the abnormal cell culture medium signal are grouped (training set and prediction set). The training set includes 409 samples, and the prediction set includes 200 samples (100 normal cell culture medium samples and 100 abnormal cell culture medium samples). After the analysis by SVM algorithm, the result shows that the signal recognition rate in the cell culture medium is 78%.

TABLE 3

Statistics of SVM classification result

| | Normal cell culture medium (SVM) | Abnormal cell culture medium (SVM) |
|---|---|---|
| Normal cell culture medium (Original) | 72 | 28 |
| Abnormal cell culture medium (Original) | 16 | 84 |

The present disclosure adopts the collection of cell culture medium, and collection, processing, and analysis of Raman spectral signal, the original Raman spectral signal of the metabolite in the cell culture medium is measured by using Raman spectroscopy. It is determined whether the original Raman spectral signal is qualified, and the data signal processing is performed on the qualified original Raman spectral signal to obtain the analyzable signal. Then, the differential statistical analysis is performed on the analyzable signal to obtain the differential signal. The differential signal is modeled and classified by the support vector machine. The normal and abnormal cell culture medium spectral signals are distinguished to obtain the quality result of the cell culture medium. The present disclosure assesses the quality of the cell culture medium by detecting the differential signal in the cell culture medium by Raman spectroscopy, thus achieving the purpose of non-invasive evaluation of the cell growth state. In addition, the present disclosure is convenient, effective, low-cost, and can be industrialized and streamlined on a large scale.

What is claimed is:

1. A method of assessing quality of a cell culture medium based on Raman spectroscopic measurement, the method comprising:
   (1) obtaining the cell culture medium that is cell cultured for a period of time;
   (2) measuring an original Raman spectral signal of metabolites in the cell culture medium obtained in step (1) using Raman spectroscopy; determining whether the original Raman spectral signal is qualified, proceeding to step (3) if yes; otherwise, repeatedly performing the Raman spectroscopic measurement on the cell culture medium;
   (3) performing data signal processing on the qualified original Raman spectral signal obtained in step (2) to obtain an analyzable signal, including:
   1) performing data correction on the obtained qualified original Raman spectral signal using a least squares algorithm to find a best function match of a data by minimizing a sum of squares of errors, wherein the best function match achieves the data correction by minimizing a sum of squares of a distance between a sampling point and a fitting curve;
   2) removing a fluorescence signal background from the Raman spectral signal subjected to the data correction obtained in step (3)1) including,
   a. accurately determining a peak position by using a continuous wavelet mode matching method taking Mexican hat wavelet as a generating function;
   b. determining an initial position of the peak by continuing to use a continuous wavelet derivation method taking Haar wavelet as a generating function; and
   c. fitting a smooth adjustable background by using a penalty least square method; and 3) performing homogenization treatment on the Raman spectral signal subjected to the removing the fluorescence signal background obtained in step (3)2) based on Stouffer's Z-score algorithm to obtain the analyzable signal; and
   (4) performing differential statistical analysis on the analyzable signal obtained in step (3) to obtain a differential signal, modeling the differential signal, classifying the differential signal by a support vector machine, and distinguishing normal and abnormal cell culture medium spectral signals to obtain a quality result of the cell culture medium.

2. The method of claim 1, wherein the cell culture medium obtained in step (1) is 7 μl.

3. The method of claim 2, wherein the 7 μl of the cell culture medium is placed in a micro-volume cuvette.

4. The method of claim 3, wherein the micro-volume cuvette comprises a hemispherical reflector or a reflector group including a hemispherical reflector and a cylindrical reflector, the hemispherical reflector and the reflector group have highly reflective mirror surfaces.

5. The method of claim 4, wherein the highly reflective mirror surface is coated with a dielectric film or an inert metal film.

6. The method of claim 1, wherein the period of time in step (1) is in a range from 3 days to 4 days.

7. The method of claim 1, wherein determining whether the original Raman spectral signal is qualified in step (2) is at least partially based on a coefficient of variation (CV) of absolute peak intensities of a scattering peak of 0.5% ethanol solution at 880 $cm^{-1}$ is less than or equal to 5%, and a Raman shift fluctuation range is less than or equal to 2 $cm^{-1}$.

* * * * *